United States Patent
Paczkowski et al.

(10) Patent No.: US 12,132,782 B2
(45) Date of Patent: *Oct. 29, 2024

(54) METHODS AND SYSTEMS FOR LEDGER BASED CONTENT DELIVERY USING A MOBILE EDGE COMPUTING (MEC) SERVER

(71) Applicant: T-Mobile Innovations LLC, Overland Park, KS (US)

(72) Inventors: Lyle W. Paczkowski, Mission Hills, KS (US); George Jason Schnellbacher, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,018

(22) Filed: Sep. 25, 2023

(65) Prior Publication Data

US 2024/0015212 A1    Jan. 11, 2024

Related U.S. Application Data

(63) Continuation of application No. 17/860,937, filed on Jul. 8, 2022, now Pat. No. 11,818,207.

(51) Int. Cl.
*H04L 67/1074* (2022.01)
*H04L 65/70* (2022.01)

(52) U.S. Cl.
CPC ............ *H04L 67/108* (2013.01); *H04L 65/70* (2022.05)

(58) Field of Classification Search
CPC ............................ H04L 67/108; H04L 65/70
See application file for complete search history.

(56) References Cited

U.S. PATENT DOCUMENTS

| | | |
|---|---|---|
| 5,555,244 A | 9/1996 | Gupta et al. |
| 6,172,990 B1 | 1/2001 | Deb et al. |
| 6,512,773 B1 | 1/2003 | Scott |
| 6,693,900 B1 | 2/2004 | Kaaresoja et al. |
| 6,760,345 B1 | 7/2004 | Rosengard |
| 7,581,094 B1 | 8/2009 | Apostolopoulos et al. |

(Continued)

OTHER PUBLICATIONS

Foreign Communication from a Related Counterpart Application, International Search Report and Written Opinion dated Oct. 23, 2023, International Application No. PCT/ US2023/071274.

(Continued)

*Primary Examiner* — Caroline H Jahnige

(57) ABSTRACT

A method comprises receiving a blockchain comprising instructions for decompressing and reassembling media content stored at a storage system in the system, wherein a first block of the blockchain comprises data describing a compression scheme performed on a plurality of media packages associated with the media content, and wherein a second block of the blockchain comprises data regarding reassembly and rendering of the media packages to generate a render of the media content, decompressing media packages associated with the media content based on the data describing the compression scheme carried in the first block of the blockchain, reassembling the media packages to generate the render of the media content based on the data regarding reassembly and rendering of the media packages carried in the second block of the blockchain.

20 Claims, 8 Drawing Sheets

(56) References Cited

U.S. PATENT DOCUMENTS

| | | |
|---|---|---|
| 7,793,823 B2 | 9/2010 | Klein, Jr. |
| 9,317,622 B1 | 4/2016 | Zuromski et al. |
| 10,348,505 B1 | 7/2019 | Crawforth et al. |
| 10,608,895 B2 | 3/2020 | Shaw et al. |
| 11,100,197 B1 | 8/2021 | Bernardi |
| 11,611,615 B1 | 3/2023 | Long et al. |
| 11,792,259 B1 | 10/2023 | Paczkowski et al. |
| 11,818,207 B1 | 11/2023 | Paczkowski et al. |
| 2002/0003811 A1 | 1/2002 | Herrmann |
| 2002/0163911 A1 | 11/2002 | Wee et al. |
| 2004/0091114 A1 | 5/2004 | Carter et al. |
| 2007/0130359 A1 | 6/2007 | Amini et al. |
| 2009/0327244 A1 | 12/2009 | Rizal |
| 2011/0222683 A1 | 9/2011 | Struik |
| 2013/0046968 A1 | 2/2013 | Dinan |
| 2013/0275755 A1 | 10/2013 | Ignatchenko |
| 2015/0379276 A1 | 12/2015 | Glickman et al. |
| 2017/0163733 A1 | 6/2017 | Grefen et al. |
| 2017/0289316 A1 | 10/2017 | Solis |
| 2018/0103122 A1 | 4/2018 | Rothera et al. |
| 2018/0276600 A1 | 9/2018 | Fuller et al. |
| 2018/0323980 A1 | 11/2018 | Ahn et al. |
| 2019/0109713 A1 | 4/2019 | Clark et al. |
| 2019/0114182 A1 | 4/2019 | Chalakudi et al. |
| 2019/0121673 A1 | 4/2019 | Gold et al. |
| 2019/0158269 A1 | 5/2019 | Kesarwani et al. |
| 2019/0266132 A1 | 8/2019 | Rubenstein |
| 2019/0334985 A1 | 10/2019 | Bradley et al. |
| 2020/0014988 A1 | 1/2020 | Navali et al. |
| 2020/0159889 A1 | 5/2020 | Chui et al. |
| 2020/0159890 A1 | 5/2020 | Chui et al. |
| 2020/0169382 A1 | 5/2020 | Factor et al. |
| 2020/0302431 A1* | 9/2020 | Polehn ................. H04L 67/1004 |
| 2021/0027265 A1* | 1/2021 | Hasek, IV ............ H04L 9/3239 |
| 2021/0029216 A1 | 1/2021 | Stockert et al. |
| 2021/0117982 A1 | 4/2021 | Johnson et al. |
| 2021/0274235 A1* | 9/2021 | Anderegg .......... H04N 21/6581 |
| 2021/0329075 A1* | 10/2021 | Sardesai ................ H04L 9/3239 |
| 2021/0360500 A1 | 11/2021 | Mehta et al. |
| 2021/0377041 A1 | 12/2021 | Covaci et al. |
| 2022/0038260 A1 | 2/2022 | Chakra et al. |
| 2022/0038288 A1 | 2/2022 | Chakra et al. |
| 2022/0159096 A1 | 5/2022 | Mantri et al. |
| 2022/0182217 A1 | 6/2022 | Jaquette et al. |
| 2022/0182219 A1 | 6/2022 | Jaquette et al. |
| 2022/0217317 A1 | 7/2022 | Xu et al. |
| 2022/0263786 A1 | 8/2022 | Brown et al. |
| 2022/0351468 A1* | 11/2022 | Rahman .............. G06F 9/45558 |
| 2022/0407707 A1 | 12/2022 | Gaur et al. |
| 2022/0414664 A1 | 12/2022 | Liu et al. |
| 2023/0032836 A1 | 2/2023 | Pabón et al. |
| 2023/0111001 A1 | 4/2023 | Jaquette et al. |
| 2023/0185996 A1 | 6/2023 | Jenrola |

OTHER PUBLICATIONS

Notice of Allowance dated Jun. 2, 2023, U.S. Appl. No. 17/955,096, filed Sep. 28, 2022.

Notice of Allowance dated Jul. 3, 2023, U.S. Appl. No. 17/860,937, filed Jul. 8, 2022.

Paczkowski, Lyle W., et al., "Methods and Systems for Distributing Rendering Across Devices in a Customer Premise," filed Sep. 28, 2022, U.S. Appl. No. 17/955,096.

"Paczkowski, Lyle W., et al., ""Methods and Systems for Distributing Rendering Across Devices in a Customer Premise,"" filed Jul. 28, 2023, International Application No. PCT/US23/71274."

Paczkowski, Lyle W., et al., "Methods and Systems for Distributing Rendering Across Devices in a Customer Premise," filed Sep. 1, 2023, U.S. Appl. No. 18/460,363.

\* cited by examiner

METHODS AND SYSTEMS FOR LEDGER BASED CONTENT DELIVERY USING A MOBILE EDGE COMPUTING (MEC) SERVER

CROSS-REFERENCE TO RELATED APPLICATIONS

This application is a continuation of and claims priority under 35 U.S.C. § 120 to U.S. patent application Ser. No. 17/860,937 filed on Jul. 8, 2022, entitled "Methods and Systems for Ledger Based Content Delivery Using a Mobile Edge Computing (MEC) Server" by Lyle W. Paczkowski, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Currently, streaming media transmission through the network accounts for about 82 percent (%) of total Internet traffic, with the amount of bandwidth occupied by streaming media transmissions exponentially increasing each year. Media content is conventionally sent from content servers directly to end user devices, such that the end user device is responsible for streaming and rendering the media content. However, increasing numbers of end user devices do not include the processing capabilities of standard laptops and handheld devices, such as wearable devices and Internet of Things (IoT) devices. Therefore, there is a need to provide a more efficient mechanism by which to provide streaming media content from the content servers to end user devices.

SUMMARY

In an embodiment, a method performed by a system to deliver media content to an end user device is disclosed. The method comprises receiving, by a mobile edge computing server, a blockchain comprising instructions for decompressing and reassembling media content stored at a storage system in the system, wherein a first block of the blockchain comprises data describing a compression scheme performed on a plurality of media packages associated with the media content, and wherein a second block of the blockchain comprises data regarding reassembly and rendering of the media packages to generate a render of the media content, receiving, by the mobile edge computing server, the media packages associated with the media content from the storage system, wherein the media packages comprise data and files used to render the media content, decompressing, by a rendering application at the mobile edge computing server, the media packages based on the data describing the compression scheme carried in the first block of the blockchain, reassembling, by the rendering application, the media packages to generate the render of the media content based on the data regarding reassembly and rendering of the media packages carried in the second block of the blockchain, generating, by the rendering application using a graphical processing unit of the mobile edge computing server, the render of the media content in response to decompressing the media packages and reassembling the media packages, and transmitting, by the mobile edge computing server, the render of the media content to the end user device across a plurality of different communication channels in parallel.

In another embodiment, a method performed by a system to deliver media content to an end user device is disclosed. The method comprises generating, by a packaging application of a server in the system, a plurality of media packages associated with media content received from a content publisher, wherein the media packages comprise data and files used to render the media content, storing, by a storage system coupled to the server, the media packages across a plurality of databases in the storage system, generating, by a ledger application of the server, a blockchain comprising instructions for decompressing and reassembling the media content stored at the storage system as the media packages, wherein a first block of the blockchain comprises data describing a compression scheme performed on the media packages associated with the media content, and wherein a second block of the blockchain comprises data regarding reassembly and rendering of the media packages to generate a render of the media content, obtaining, by a rendering application at a mobile edge computing server in the system, the media packages associated with the media content and the blockchain, decompressing, by the rendering application, the media packages based on the data describing the compression scheme carried in the first block of the blockchain, reassembling, by the rendering application, the media packages to generate the render of the media content based on the data regarding reassembly and rendering of the media packages carried in the second block of the blockchain, and transmitting, by the mobile edge computing server, a render of the media content to the end user device in response to decompressing the media packages and reassembling the media packages.

In yet another embodiment, a system comprising a server and a mobile edge computing server coupled to the server is disclosed. The server comprises a first processor, a first non-transitory memory, and a ledger application stored in the first non-transitory memory, which when executed by the first processor, causes the first processor to be configured to generate a blockchain comprising instructions for decompressing and reassembling media content stored at a storage system as a plurality of media packages, wherein a first block of the blockchain comprises data describing a compression scheme performed on the media packages associated with the media content, and wherein a second block of the blockchain comprises data regarding reassembly and rendering of the media packages to generate a render of the media content. The mobile edge computing service comprises a second processor, a second non-transitory memory, and a rendering application stored in the second non-transitory memory, which when executed by the second processor, causes the second processor to be configured to obtain the media packages associated with the media content and the blockchain, decompress the media packages based on the data describing the compression scheme carried in the first block of the blockchain, reassemble the media packages to generate the render of the media content based on the data regarding reassembly and rendering of the media packages carried in the second block of the blockchain, and transmit a render of the media content to an end user device in response to decompressing the media packages and reassembling the media packages.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
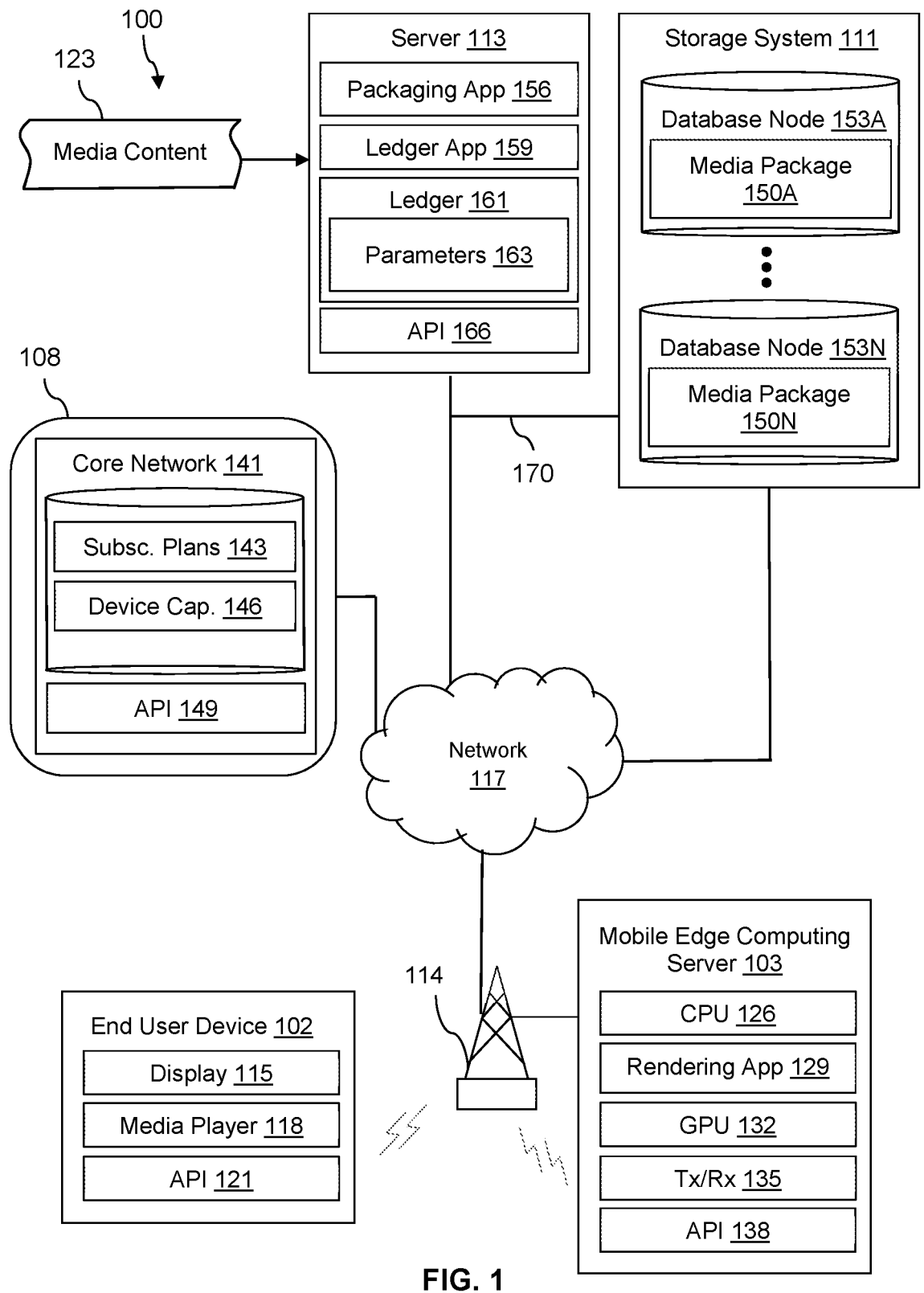
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, streaming media, particularly 4K video streams, consume the vast majority of home broadband Internet usage. For example, streaming a video in standard definition for an hour uses approximately 1 gigabyte (GB) of data. Switching the streaming to high definition or ultra-high definition raises the data usage to approximately 3 GB or 7 GB of data usage, respectively. In addition, the use of virtual reality (VR) and extended reality (XR) devices (hereinafter referred to augmented reality (AR) devices) that provide immersive user experiences are becoming increasingly more popular, and consume far more data than simply video streaming. Streaming media and streaming AR media are first published to content servers and then, upon request, transmitted directly to different end user devices. Thus, the network has become flooded with the transmission of streaming media and streaming AR media. In this way, the consumption patterns for streaming media and AR devices may soon provide significant stresses to the network load and capacity.

Moreover, an increasing number of end user devices are becoming smaller in size to provide more convenient and compact devices for the end user. For example, wearable devices and portable devices have been getting smaller and thinner over time as a result of consumer demand for lightweight wearable devices and easier to carry handheld devices. As these devices get smaller, the devices may lack the requisite hardware to process and render streaming media and AR media. Instead, these devices may only have the hardware for displaying a rendered media stream. Therefore, the method of simply transmitting the requested media files to the end user device may soon be outdated since these devices may not be capable of actually rendering the media. Additionally, battery reserves of smaller devices may quickly be depleted by the intense processing required for media rendering.

The present disclosure addresses the foregoing technical problems by providing a technical solution in the technical field of file transmission across a network. In an embodiment, the system may additionally include a cloud storage system and one or more mobile edge cloud (MEC) servers to provide streaming media content from the content server to the end user device in a far more transport efficient manner. The cloud storage system may be a decentralized file system, such as, for example, an interplanetary file system (IPFS), storing media content in a distributed manner. The MEC server may be positioned between the content server and the end user device (e.g., at the customer premise or somewhere in the communication system between the backhaul network and the end user devices). The MEC server may be, for example, a server, a personal computer, a laptop, or even a handheld device including CPU and GPU capabilities.

Media content may be published to the storage system, in which a packaging application at a server coupled to the storage system may segment the content into multiple media packages including raw data and files related to a segment of the media content. The storage system may store the different media packages across different database nodes (e.g., IPFS clusters) in the storage system. A ledger application at the server may generate a ledger defining various parameters related to the successful transmission, reassembly, and rendering of the media packages. In an embodiment, the ledger may be any data structure that may carry parameters and be distributed through the network and updated by different entities in the network in an efficient and secure manner. For example, the ledger may be encoded as a blockchain, with each block in the blockchain carrying at least one of the parameters. While in some embodiments blockchain may rely upon consensus voting among a plurality of different host computers maintaining copies of the same blockchain, it is contemplated that, in at least some embodiments of the ledger taught herein, consensus voting may be dispensed with. For example, the parameters may indicate how to fetch the media packages from the storage system, reassemble the media packages into the requested media content, decrypt the media packages, decompress the media packages, charge/pay for the requested media content, and any other data related to the packages. The parameters may also indicate a state of the network or system, a network user profile for one or more end user devices, rights of access of one or more end user devices, storage server media structures, etc. For example, the packaging application and the ledger application at the server may use pre-defined smart contracts, which may include instructions defined for each end user based on subscription authorizations at a core network. The packaging application and ledger application may execute the smart contracts to control and define how the media packages and ledgers are generated and delivered to end user devices.

In an embodiment, the ledger application may transmit the ledger to multiple MEC servers and end user devices for local storage, such that the MEC server may call upon the data in the ledgers when a request for the media content is received. In another embodiment, the ledger application may transmit the ledger with the media content to a MEC server located proximate to the end user device upon receiving a request from the end user device for media content. In some embodiments, the server or the storage system may pull content from numerous MEC servers for storage at the storage system, or may push content to numerous MEC servers for storage at the MEC servers.

The MEC server may fetch, decrypt, decompress, and reassemble the media content based on the parameters in the ledger, to render the media content locally using the powerful GPU at the MEC server, before transmitting the final rendered form of the media content to the end user device. In this way, the embodiments disclosed herein reduce traffic in the network core by distributing the ledgers and/or content to the MEC servers at the edges of the network, and the ledgers may be used to retrieve final rendered content at lightweight UEs. This is because the UEs do not need to communicate with the backend storage systems to retrieve the parameters that may, in the embodiments disclosed herein, be stored at the MEC servers.

The powerful rendering performed by the MEC server based on the instructions and data in the ledger enables the rendered content to be lossless and in high fidelity (e.g., 4K, 3-dimensional (3D), or 360° stereoscopic video), with low latency. In some cases, the server or the storage system may transmit the media packages to the MEC server across multiple data channels, and/or the MEC server may similarly transmit the rendered content across multiple data channels, instead of a single channel. The transmission of data over multiple data channels in parallel enables a more network efficient manner of file transmission. For example, the data of the rendered content may be transmitted in parallel over, for example, multiple underutilized data channels having more available bandwidth, instead of a single, possibly overutilized, data channel. In addition, the data may be transmitted simultaneously in parallel over the multiple channels, such that the data may be received by the MEC server/end user devices faster than when the data is transmitted slowly over a single channel. Therefore, the transmission of rendered content may be performed in a more robust and flexible manner, while the rendered content is received by the MEC server/end user devices in a faster manner. In this way, end user devices, particularly the lighter weight and less complex devices, may display the rendered content, while performing little to no rendering, buffering, or other complex processing at the end user device side. By reducing the computations done at the end user devices, the methods disclosed herein also enable the extension of the battery life of the end user devices.

In some cases, the MEC server and/or the end user device may add events to the ledger based on a consumption history of the media content at the end user device, and the ledger may be transmitted back to the storage system. In an embodiment, the end user device may collect consumption data regarding the media content. The consumption data may indicate data regarding the end user's viewing of or interaction with the media content. For example, the consumption data may indicate the media content, time of consumption (e.g., viewing of or interaction with), location of consumption, frequency of consumption, burst speed, transmission rate, network conditions, etc. The consumption data may also include data regarding the end user, such as, for example, a gender or age of the end user viewing or interacting with the media content. The end user device may add a block to the ledger including the consumption data collected. In this way, the use of the ledger enables different MEC servers and end user devices to add data to the ledger in an efficient, secure, and transparent manner. Since the ledger may be distributed throughout the network, the carrier network may use the ledgers for other types of functions, such as tracking, monetization, auditing, etc.

The end user device may transmit the consumption data to the MEC server in a block of an updated ledger, and the MEC server may update local artificial intelligence (AI) systems or machine learning systems using the consumption data (i.e., update the training data of the AI systems and machine learning systems to include the consumption data). Similarly, the MEC server may forward the updated ledger including the consumption data to the storage system, such that the server coupled to the storage system may also update the AI systems or machine learning systems using the consumption data. Upon updating the AI systems or machine learning systems at the storage system, the server and the store system may be enabled to more accurately determine frequently accessed content. For example, media content may be determined to be frequently accessed when a quantity of consumption of the media content exceeds a threshold value. The storage system may push the frequently accessed content, in the form of multiple media packages, across one or more communication channels, to the MEC server.

Therefore, the storage system may use the data received in the ledgers to keep track of what households consume in terms of media content, and then use this knowledge to update AI based systems that may be used to proactively push content to the MEC servers according to user consumption patterns (e.g., overnight, at non-busy hours, at higher data rates). As a result, the MEC server may store the data for some of the more highly requested and frequently accessed media content. In this way, the end user does not need to retrieve such media content from the content network or from the storage system positioned behind the network. The end user devices may instead receive the media content directly from the MEC servers that are located much more proximate to the end user devices. Therefore, the embodiments of this disclosure reduce the volume of data that may otherwise be needed to stream media content over the Internet. Also, the transmission of some of the media content may be scheduled for off-peak hours to conserve network resources during the peak hours.

In an embodiment, the packaging application may automatically clean up old content files, which, for example, have not been accessed for a predefined period of time, to manage storage space at the storage server. The storage system may be configured to delete media packages and other files based on a history of access, expiration timer, or other cold data deletion configuration. The configuration may be included in one or more ledgers associated with the media content.

In an embodiment, user generated content may be distributed, sold, and tracked through the system. Individuals may create or invest in media content as an asset, such as, for example, via a non-fungible token (NFT) type method. A record of this investment may be recorded as a block in the ledger. In this way, the invested media content may be monetized using the ledgers disclosed herein.

Accordingly, the ledgers as disclosed herein serve several purposes, from digital rights management, to analytics with AI and machine learnings, to settlements between content owners and content distributes, and much more. In this way, the embodiments disclosed herein enable an intelligent and economic media transfer solution that may align with the Web3 framework and the metaverse, providing enhanced user experiences without overloading the network.

Turning now to FIG. 1, a communication system 100 is described. The system 100 comprises an end user device 102, a MEC server 103, a carrier network 108, a storage system 111, a server 113 in communication with the storage system 111, a cell site 114, and a network 117. The end user device 102 may be communicatively coupled to the MEC server 103, carrier network 108, storage system 111, and server 113 via the cell site 114. The MEC server 103 may also be communicatively coupled to the end user device 102, carrier network 108, storage system 111, and server 113 via the cell site 114.

The end user device 102 may be a cell phone, a mobile phone, a smart phone, a personal digital assistant (PDA), an Internet of things (IoT) device, a wearable device, an AR device, a headset device, a laptop computer, a tablet computer, a notebook computer, a medical device, a vehicle computer, etc. The end user device 102 includes a display 115, a media player 118, and one or more application program interfaces (APIs) 121. The display 115 may be a computer output surface or projecting mechanism that shows the media content 123 to an end user operating the end user device 102. The media content 123 may be, for example, graphical images, audio, video, or any type of AR stream. The media player 118 may be a software program or hardware device configured to play the media content 123 via the display 115. The media player 118 may receive rendered media content 123 and play the rendered media content 123 on the display 115. The APIs 121 may be interfaces by which the end user device 102 may communicate with the MEC server 103, carrier network 108, storage system 111, and server 113. The end user of the end user device 102 may be a subscriber of the carrier network 108, registered with the carrier network 108.

The MEC server 103 (also referred to as a "far edge computing server") may be a computing device that extends the capabilities of cloud computing by bringing the services to the edge of the network 117 or to a customer premise (e.g., in a home of the end user). For example, the MEC server 103 may be one or more servers, a computer box, personal computer, laptop, or even a handheld device, such as a mobile phone or tablet, with processing, storage, and network transmission capabilities. The MEC server 103 may be positioned anywhere in the system 100 between the network 117 and the end user device 102. For example, as mentioned above, the MEC server 103 may be located at the home of the end user device 102. Alternatively, the MEC server 103 may be positioned within a certain geographical range of the cell site 114 so as to serve multiple end user devices 102 within a region. The MEC server 103 may even be coupled directly to the cell site 114.

As shown in FIG. 1, the MEC server 103 includes a central processing unit (CPU) 126, a rendering application 129, a graphics processing unit (GPU) 132, a transceiver (Tx/Rx) 135, and one or more APIs 138. The CPU 126 includes one or more processors that executes instructions including a computer program to provide the functions of the MEC server 103 described herein. The GPU 132 is a specialized processor used for graphics and video rendering in high fidelity. The MEC server 103 may also include a graphics card or video card, which is an add-in board that incorporates the GPU 132 for graphics and video rendering. The rendering application 129 operates with the GPU 132 to render the media content 123, as further described herein. Media content 123 is rendered when the raw or coded data and files related to the media content 123 is converted to a format required for display or printing. Rendering may be performed using different types of algorithms or modeling techniques, such as, for example, rasterization, ray casting, ray tracing, radiosity, etc. The Tx/Rx 135 is a transceiver that may receive media packages from the storage system 111 and transmit rendered media content 123 to the end user device 102, both across multiple different communication channels in parallel. The APIs 138 may be interfaces by which the MEC server 103 may communicate with the end user device 102, carrier network 108, storage system 111, and server 113. As should be appreciated, the MEC server 103 may include other components and applications other than the CPU 126, rendering application 129, GPU 132, Tx/Rx 135, and API 138 shown in FIG. 1.

The cell site 114 provides the end user device 102 and/or MEC server 103 a wireless communication link to the carrier network 108, network 117, storage system 111, and server 113 according to a 5G, a long term evolution (LTE), a code division multiple access (CDMA), or a global system for mobile communications (GSM) wireless telecommunication protocol. The network 117 may be one or more private networks, one or more public networks, or a combination thereof. While FIG. 1 shows the carrier network 108, storage system 111, and server 113 as being separate from the network 117, it should be appreciated that, in some embodiments, at least a portion of the carrier network 108, storage system 111, and server 113 may be part of the network 117.

The carrier network 108 may be a network including a radio access network (RAN) and a core network 141. The RAN may include the access network containing the radio elements of a cell network, and the core network 141 may include the elements that manage the subscriber information, call setup and routing, and related system supports. In an embodiment, the core network 141 may be an evolved packet core (EPC) core network. The core network 141 may be a configured to implement a 5G, a LTE, a CDMA, or a GSM wireless telecommunication protocol. In one embodiment, the core network 141 may be a 3rd Generation Partnership Project (3GPP) Evolved Packet System (EPS).

The core network 141 may store subscriber data related to one or more end users operating one or more end user devices 102. The subscriber data may include, for example, subscription plans 143 and device capabilities 146 related to one or more end user devices 102 that have been registered with the carrier network 108. A subscription plan 143 may be an agreement between an end user and a carrier network provider, according to which the carrier network provider agrees to provide one or more end user devices 102 belonging to the end user a set of services under the terms of the subscription plan 143. The end user receives the right to use the services and agrees to pay for these services per the agreement. For example, the subscription plan 143 may indicate identification information regarding the end user/subscriber (e.g., name, address, etc.) and details regarding end user devices 102, such as, for example, mobile station international subscriber directory numbers (MSISDNs) of end user devices 102 belonging to the end user, subscribed for quality of service (QoS) parameters (e.g., expected bit rate, latency, jitter, etc.), and other subscription data. The device capabilities 146 indicate capabilities of the end user devices 102 belonging to the end user. For example, the device capabilities 146 may indicate the display resolutions that the end user device 102 is capable of displaying, the type of media players 118 installed at the end user device 102, the screen size of the end user device 102, the type of speaker at the end user device 102, etc. The one or more APIs 149 may each be an interface by which a network element in the carrier network 108 communicates with the end user device 102, MEC server 103, storage system 111, and server 113. While FIG. 1 shows the core network 141 as storing subscription plans 143 and device capabilities 146, it should be appreciated that the core network 141 also includes other data and applications not otherwise shown in FIG. 1.

The storage system 111 may be a decentralized file system, such as, for example, an interplanetary file system (IPFS). For example, the storage system 111 may be located at one or more data centers and implemented as a cloud data storage. The storage system 111 may comprise multiple servers and memories (e.g., databases and data stores), often distributed over multiple locations, with each location being a data center. The storage system 111 may be owned and operated by a host, and may offer a pay-as-you-go model, in which users pay for storage and processing resources as they are used, which can help reduce capital expenses for operations.

The storage system 111 may store media content 123 in a distributed manner in the form of multiple media packages 150A-N across multiple database nodes 153A-N (also referred to herein as simply "databases 153A-N"), respectively. To this end, FIG. 1 shows the storage system 111 as including multiple database nodes 153A-N, which may each be a server node comprising memories for data storage. In some cases, each database node 153A-N may have a maximum storage capacity or may enforce a maximum file size or package size permitted for each file or package stored at the database node 153A-N. As shown in FIG. 1, each database node 153A-N stores a respective media package 150A-N. The database nodes 153A-N together storing the media packages 150A-N may be implemented as an IPFS cluster, or each of the database nodes 153A-N may be implemented as an IPFS cluster.

The server 113 may be a server with processing, storage, and network transmission capabilities, which is coupled to the storage system 111 by the link 170, which may be a wired or wireless link. The server 113 may include a packaging application 156, a ledger application 159, a ledger 161, and one or more APIs 166. The packaging application 156 may receive media content 123, which has been published by a content producer or publisher. The packaging application 156 may then segment the media content 123 (i.e., the data and files that constitute the media content 123) into the multiple different media packages 150A-N, in which N may be any integer greater than 1. For example, the media content 123 may be divided or segmented based on a maximum size of data permitted to be stored at each database node 153A-N in the storage system 111. For example, when each database node 153A-N in the storage system 111 is permitted to store a package having a maximum of 256 kilobytes (KB) of data, then the media content 123 may be segmented into multiple media packages 150A-N, each being less than or equal to 256 KB in size. The packaging application 156 may then transmit the media packages 150A-N to the storage system 111 for storage across the database nodes 153A-N in a distrusted manner. The storage system 111 may store the different media packages 150A-N across the different database nodes 153A-N. As should be appreciated, the server 113 may include other components, applications, and data other than the packaging application 156, the ledger application 159, and the APIs 166.

The ledger application 159 may be executed during the segmenting of the media content 123 by the packaging application 156, before the segmenting, or after the segmenting, to generate the ledger 161 describing details regarding the media content 123 and the media packages 150A-N. The ledger 161 may be a manifest, blockchain, or any other type of ledger, for example, generated using a distributed ledger technology (DLT) protocol. The ledger 161 may include various parameters 163 related to the successful transmission and reassembly of the packages. For example, the parameters 163 may indicate how to fetch the media packages 150A-N from the storage system 111, reassemble the media packages 150A-N into the requested media content 123, decrypt the media packages 150A-N, decompress the media packages 150A-N using one or more tokenization methods, charge or pay for the requested media content 123, and any other data related to the packages. For example, the ledger 161 may be in the form of a blockchain, with each block in the blockchain carrying one of the different parameters 163. The one or more APIs 166 may each be an interface by which the server 113 may communicate with the storage system 111, the carrier network 108, the MEC server 103, and the end user device 102.

While FIG. 1 shows the storage system 111 and the server 113 as being separate from each other but coupled together via a communication link 170, it should be appreciated that in other embodiments, the storage system 111 and the server 113 may be positioned together across the same servers in a data center, for example. While FIG. 1 shows the storage system 111 and the server 113 as being separate from the carrier network 108, it should be appreciated that in other embodiments, the storage system 111 and the server 113 may be part of the carrier network 108.

Figure 2:
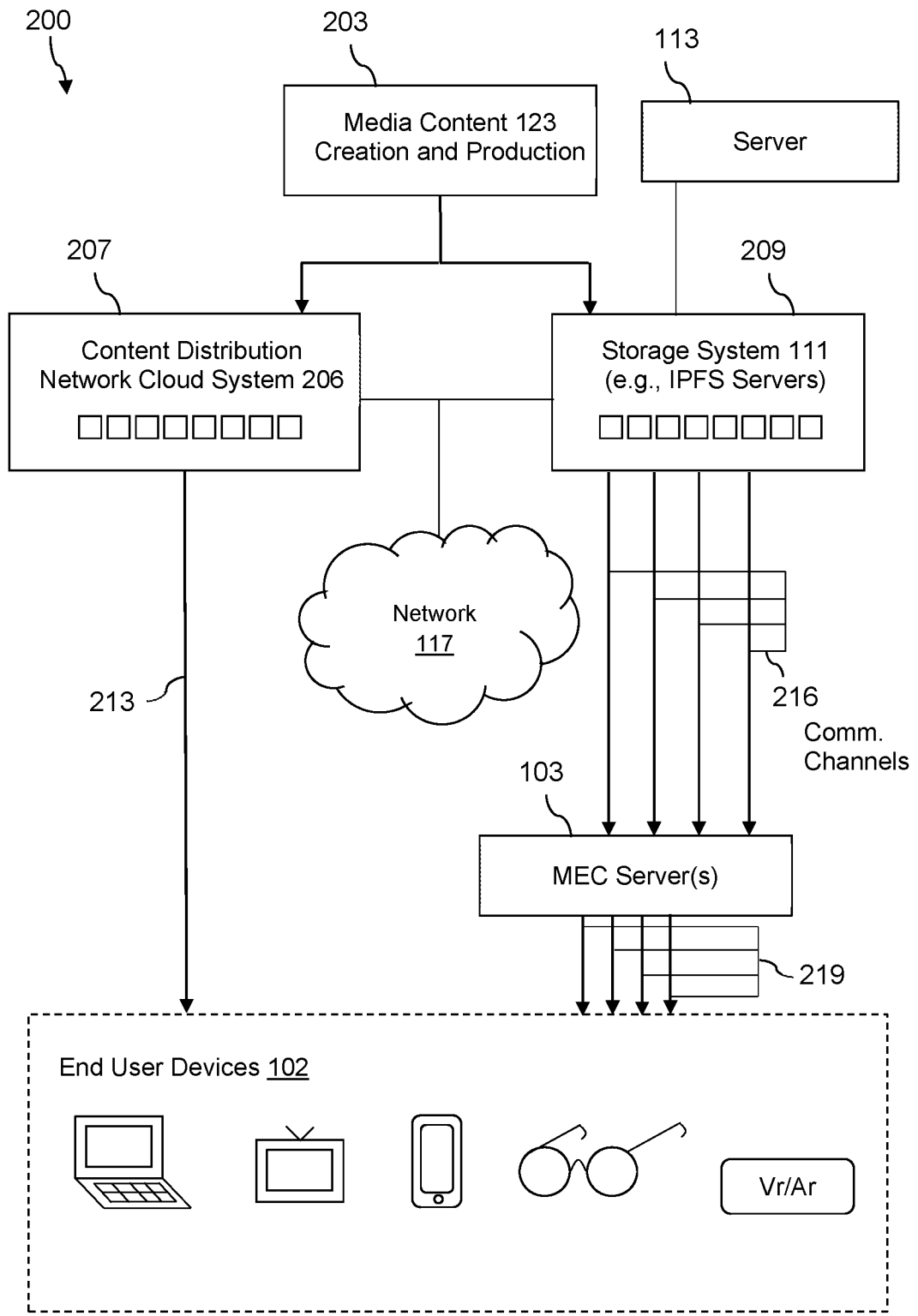
FIG. 2 is block diagram illustrating a method implemented by the communication system according to an embodiment of the disclosure.

Turning to FIG. 2, shown is a block diagram illustrating a method 200 implemented by the communication system 100 of FIG. 1. The method 200 may begin at block 203 in which a content creator or publisher produces media content 123. After creating the media content 123, the publisher may publish the media content 123 to either a content distribution network cloud system 206, at step 207, or the storage system 111, at step 209. The content distribution network cloud system 206 may be similar to a content delivery network, which is a geographically distributed network of proxy servers and corresponding data centers. The content distribution network cloud system 206 provides a service for storing content, such as web objects (e.g., text, graphics, scripts, etc.), downloadable objects (e.g., media files, software, documents, etc.), applications (e.g., e-commerce, portals, etc.), live streaming media, on-demand streaming media, social media sites, and other Internet content. Content owners such as media companies and e-commerce vendors pay the content distribution network cloud system 206 operators to deliver content to end user devices 102.

The content distribution network cloud system 206 may receive a request from an end user device 102 for media content 123 stored at the content distribution network cloud system 206. The content distribution network cloud system 206 may obtain the files related to the media content 123, and send or stream the files to the end user device 102, as shown by arrow 213. In this case, the end user devices 102 are responsible for assembling the files, including raw data regarding the media content 123, to render the media content 123 for display using a media player 118 of the end user device 102. The end user device 102 may perform real-time rendering to generate images as the files are received, for example, using a rendering algorithm or model executed at the end user device 102. For example, the end user device 102 may perform CPU rendering using a CPU at the end user device 102, or GPU rendering using a GPU at the end user device 102. However, as mentioned above, many types of end user devices 102 are smaller devices, such as wearable devices or AR headsets, which may not include the CPU and/or GPU hardware required to properly render media content 123.

The embodiments disclosed herein may avoid the foregoing technical problem by using the storage system 111 and MEC server(s) 103 to transport and render media content 123 at one or more end user devices 103. After step 209 in which the media content 123 has been transmitted to the storage system 111 or server 113, the packaging application 156 at the server 111 may segment (i.e., fragment) the raw data and files related to the media content 123 into multiple media packages 150A-N. The size of the media packages 150A-N may be based on a maximum size of files permitted at the database nodes 153A-N in the storage system 111. The packaging application 156 may transmit the media packages 150A-N to the storage system 111, such that the storage system 111 stores each of the media packages 150A-N across different database nodes 153A-N.

The ledger application 159 may generate the ledger 161 describing the media content 123 and the media packages 150A-N and including instructions on how to decompress the media packages 150A-N and reassemble the media packages 150A-N for rendering. The ledger 161 may be a blockchain including multiple blocks, each representing a parameter 163 related to the successful transmission, reassembly, and rendering of the media packages 150A-N. An example of the information contained in the blocks of the ledger 161 is further described below with reference to FIG. 3. For example, one of the blocks in the ledger 161 may indicate the compression or tokenization scheme used to compress the data in each of the media packages 150A-N. Another one of the blocks in the ledger 161 may indicate an order of the media packages 150A-N and a location of each of the media packages (i.e., an address of the respective database node 153A-N) storing a respective media package 150A-N. Another one of the blocks in the ledger 161 may include analytical data regarding, for example, a history of consumption of the media content 123 by one or more end user devices 102.

Another one of the blocks in the ledger 161 may include data regarding one or more subscription plans 143 indicating QoS requirements or network requirements subscribed for by the end user when receiving media content 123. In this case, the ledger application 159 may communicate with the core network 141 using one or more API calls via APIs 149 and 166 to retrieve subscription plans 143 and device capabilities 146 related to an end user device 102 associated with the subscription plan 143. In an embodiment, the ledger application 159 may generate multiple ledgers 161 for different end user devices 102, each ledger 161 including a different parameter 163 or block related to the subscription plans 143 and the device capabilities 146. For example, the ledger application 159 may generate a first ledger 161 for a first end user device 102 requesting media content 123, the first ledger 161 including a parameter 163 defining a subscription plan 143 and a device capability 146 related to the first end user device 102. The ledger application 159 may generate a second ledger 161 for a second end user device 102 requesting the media content 123, the second ledger 161 including a different parameter 163 defining a subscription plan 143 and a device capability 146 related to a second end user device 102. The first end user device 102 may subscribe to a higher QoS than the second end user device 102, and the first end user device 102 may have a higher screen resolution than the second end user device 102. This data may be noted in the first and second ledger 161, such that MEC server 103 may use this data during the separate rendering of the media content 123 for the first end user device 102 and the second end user device 102.

Another one of the blocks in the ledger may indicate a state of the network or network characteristics of a particular location of an end user device. In an embodiment, network elements in the communication system 100 or network 117 may transmit network data to the server 111, describing network characteristics at the particular location. For example, the server 111 may receive signal strength data indicating that a signal strength at a rural area may be weaker than signal strength in bigger cities, and the ledger application 159 may include this data as a parameter 163 in the ledger 161.

After generating the ledgers 161, the ledger application 159 may transmit one or more of the ledgers 161 to one or more MEC servers 103 and/or one or more end user devices 102. In an embodiment, the MEC servers 103 and end user devices 102 may store the ledgers 161 locally such that the ledgers 161 may be accessed in response to receiving a request for a particular media content 123 from the end user device 102. In this embodiment, the MEC servers 103 may use the data in ledgers 161, with data describing the requesting end user device 102, to fetch the media packages 150A-N from the storage system 111 in response to receiving the request for the media content 123. In another embodiment, the end user device 102 may transmit a request for media content 123 to the MEC server 103 and the storage system 111/server 113 before the ledger 161 related to that particular end user device 102 is transmitted to the MEC server 103. In this embodiment, the ledger application 159 may transmit the ledger 161 with the media packages 150A-N of the request media content 123 to the MEC server 103 proximate to or serving the end user device 102. For example, the ledger 161 may be specific to the end user device 102 requesting the media content 123, and may be transmitted as a preamble in a data stream including the ledger 161 and the media packages 150A-N of the media content 123.

In either embodiment, the ledger application 159 may transmit the ledger(s) 161 and the media packages 150A-N related to a media content 123 to the MEC server 103. In an embodiment, the ledger 161 and/or the media packages 150A-N may be transmitted over one or more RAN communication channels 216 between the storage system 111/server 113 and the MEC server(s) 103. In an embodiment, the ledger 161 may be fragmented and then transmitted across multiple RAN communication channels 216 in parallel, and the already fragmented media packages 150A-N may also be transmitted across multiple RAN communication channels 216 in parallel. In some cases, more than one media package 150A-N may be sent in a single RAN communication channel 216. By transmitting the ledger 161 and the media packages 150A-N across multiple RAN communication channels 216 in parallel, the embodiments disclosed herein enable a more transport efficient mechanism by which to transfer files across the communication system 100. As mentioned above, the transmission of rendered content over multiple RAN communication channels 216 in parallel may be performed in a more robust and flexible manner, while the rendered content is received by the MEC server 103/end user devices 102 in a faster manner.

Once the MEC server 103 receives the ledger 161 and the media packages 150A-N, the MEC server 103 may first store the ledger 161 and media packages 150A-N locally in a memory. The rendering application 129 in the MEC server 103 may also use the data in the ledger 161 to decompress, decrypt, reassemble, and render the media packages 150A-N to generate the final render of the media content 123. For example, a parameter 163 in the ledger 161 may indicate a decompression or tokenization scheme to perform on the media packages 150A-N, and the rendering application 129 may perform the decompression or tokenization scheme on each of the media packages 150A-N. Another parameter 163 in the ledger 161 may indicate an order of the media packages 150A-N, and the rendering application 129 may stitch together the media packages 150A-N based on the order indicated in the ledger 161. Another parameter 163 may indicate a settlement scheme by which to pay for or charge the end user for retrieving the media content 123, and the rendering application 129 may communicate with a billing system at the core network 141 to charge the end user for the media content 123. The rendering application 129 may use the CPU 126 and the GPU 132 to generate the final render of the media content 123 using the data in the ledger 161.

In an embodiment, MEC server 103 may transmit the final render of the media content 123 to the end user device 102 over another set of RAN communication channels 219 between the MEC server 103 and the end user device 102. For example, the MEC server 103 may fragment the final render into multiple fragments and transmit each of the fragments across one or more of the RAN communication channels 219. The end user device 102 may stitch together the fragments based on an order of the fragments indicated, for example, in each of the fragments of the final render. By transmitting the final render across multiple RAN communication channels 219 in parallel, the embodiments disclosed herein enable a more transport efficient mechanism by which to transfer files across the communication system 100. As mentioned above, the transmission of rendered content over multiple RAN communication channels 219 in parallel may be performed in a more robust and flexible manner, while the rendered content is received by the MEC server 103/end user devices 102 in a faster manner. The end user device 102 may use a media player 118 to display the final render of the media content 123 on the display 115.

Figure 3:
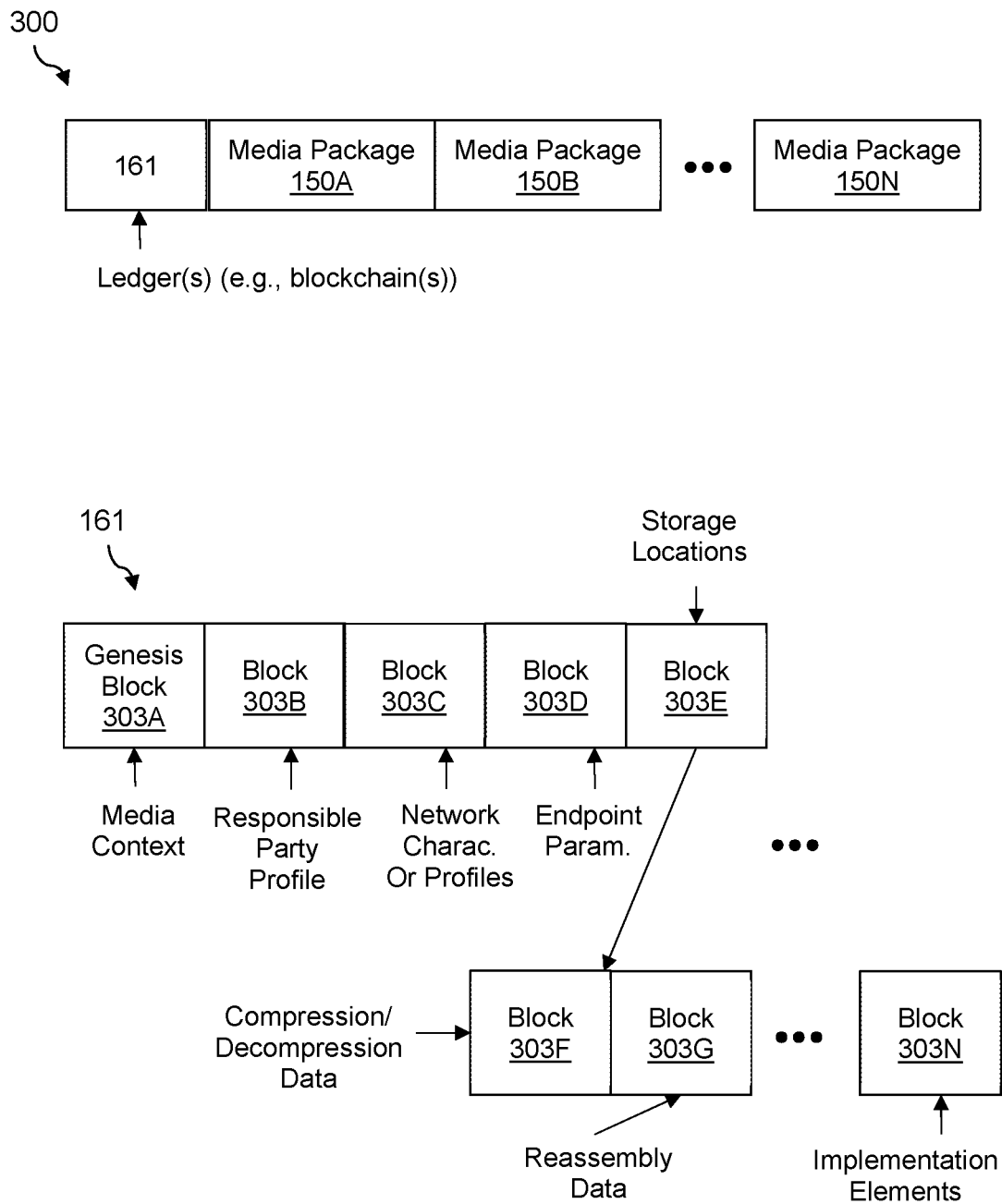
FIG. 3 is a block diagram illustrating the ledger and the media packages of the media content transmitted in the communication system of FIG. 1 according to an embodiment of the disclosure.

FIG. 3 is a block diagram illustrating an example of a data stream 300 including a ledger 161 and the corresponding media packages 150A-N related to the media content 123 transmitted in the communication system of FIG. 1, and the blocks within the ledger 161. The data stream 300 may be sent from the server 113 and/or the storage system 11 to the MEC server 103. In an embodiment, the data stream 300 includes one or more ledgers 161 associated with the media content 123, for one or more end user devices 102 or geographic areas, and the media packages 150A-N including the data and files for rendering the media content 123. The one or more ledgers 161 may be carried in the data stream 300 as a preamble to the data stream 300. In the embodiment shown in FIG. 3, the one or more ledgers 161 may be transmitted with the media packages 150A-N to the MEC server 103. However, as described above, another embodiment encompasses the scenario in which the ledgers 161 are first sent down to the MEC server 103 alone, and then the data in the ledgers 161 may be used by the MEC server 103 to subsequently fetch the media packages 150A-N from the storage system 111.

In the example shown in FIG. 3, the one or more ledgers 161 may be encoded as a blockchain. FIG. 3 illustrates examples of various blocks 303A-N within an example ledger 161 encoded as a blockchain. For example, each block in the blockchain may carry a parameter 163, a hash of the data in the block, a hash of the previous block in the blockchain, and/or any other data. The first block 303A in the example ledger 161 is referred to as a genesis block 303A, which may carry the media context of the media content 123. For example, the genesis block 303A may indicate the name of the media content 123 and locations of one or more of the media packages 150A-N of the media content 123. The second block 303B may indicate a responsible party profile and authentication, authorization, and accounting (AAA) information. For example, the second block 303B may indicate whether the media packages 150A-N are capable of being delivered, whether the end user device 102 is authorized to receive the media packages 150A-N, etc. The ledger application 159 may determine information such as whether the end user device 102 is authorized to receive the media packages 150A-N by communicating with the core network 141 to receive the subscription plans 143 and device capabilities 146 of the end user device 102. The ledger application 159 may then add this information to block 303B in the ledger 161.

The third block 303C may carry network profile information regarding one or more network characteristics in the communication system 100. The network characteristics may include, for example, backhaul signal strength, bandwidth (e.g., frequency bands), latency, throughput, jitter, packet loss, supported wireless technologies, types of devices communicating with the network element, antenna patterns, etc. The ledger application 159 may receive the network characteristics from one or more network elements in the network 117 and/or carrier network 108, and add this information to the block 303C when relevant to an end user device 102 receiving the media content 123.

The fourth block 303D may carry parameters describing one or more end user devices 102. For example, the parameters describing the end user devices 102 may indicate the device capabilities 146 of the end user device 102 and the formats of data that are permitted to be delivered to the end user device 102. The ledger application 159 may obtain the device capabilities 146 regarding the end user devices 102 from the core network 141 after the ledger application 159 receives a request for the media content 123 from the end user device. The ledger application 159 may add the device capabilities 146 to the block 303D.

The fifth block 303E may carry the locations of the media packages 150A-N in the storage system 111. For example, the fifth block 303E may carry the locations (e.g., addresses) of the database nodes 153A-N respectively carrying each of the media packages 150A-N related to the media content 123. The packaging application 156 may obtain the storage locations of the database nodes 153A-N respectively carrying each of all the media packages 150A-N, and send the storage locations to the ledger application 159. The ledger application 159 may indicate these storage locations in the block 303E such that the MEC server 303 may request the media packages 150A-N from the storage system 111 by sending the storage system 111 the storage locations of the media packages 150A-N in, for example, a series of API calls.

The sixth block 303F carries data regarding compression and/or tokenization schemes used on the media packages 150A-N to compress the data in each of the media packages 150A-N. The packaging application 156 may perform the compression and/or tokenization schemes on the media packages 150A-N before storing the media packages 150A-N at the database nodes 153A-N or before transmitting the media packages 150A-N to the MEC server 103. The ledger application 159 may store an indication of the compression or tokenization indications in the block 303F, such that the MEC server 103 may decompress the data in the media packages 150A-N according to the indications in the block 303F.

The seventh block 303G indicates data regarding methods of reassembling and rendering the media packages 150A-N to generate a final render of the media content 123. For example, the ledger application 159 may include, in the block 303G, a set of instructions regarding how to rebuild the layers and/or pixels in each frame of the media content 123 based on the data and files in the media packages 150A-N. The block 303G may also indicate the correct sequence of the media packages 150A-N, such that MEC server 103 may stitch together the media content 123 in the accurate sequence.

As shown in FIG. 3, the ledger 161 may include any number of blocks carrying any type of parameter 163 related to the transmission and rendering of the media content 123 using the media packages 150A-N. For example, the ledger 161 may include other blocks 303N carrying different parameters 163. For example, one or more of the blocks 303N may carry encryption data indicating an encryption scheme used to encrypt the media packages 150A-N, which may be used by the MEC server 103 to decrypt each of the media packages 150A-N prior to rendering. The packaging application 156 may perform the encryption scheme on the media packages 150A-N, and then inform the ledger application 159 such that ledger application 159 may indicate the encryption scheme in a block 303N of the ledger 161.

As another example, one or more of the blocks 303N may carry analytics functions and data, such as, consumption data of the media content 123 by one or more of the end user devices 102. One or more of the blocks 303N may carry settlement functions and data, which may be used to pay for or charge the end user viewing or interacting with the media content 123, by communicating with the billing system at the core network 141. Lastly, one or more of the blocks 303N may carry implementation elements, such as changing the profiles of certain end user devices 102 to accept higher speeds, etc. In the case of interactive media, one or more of the blocks 303N may distinguish between frames related to the slow moving background of the media and frames related to the fast moving foreground of the media.

Figure 4:
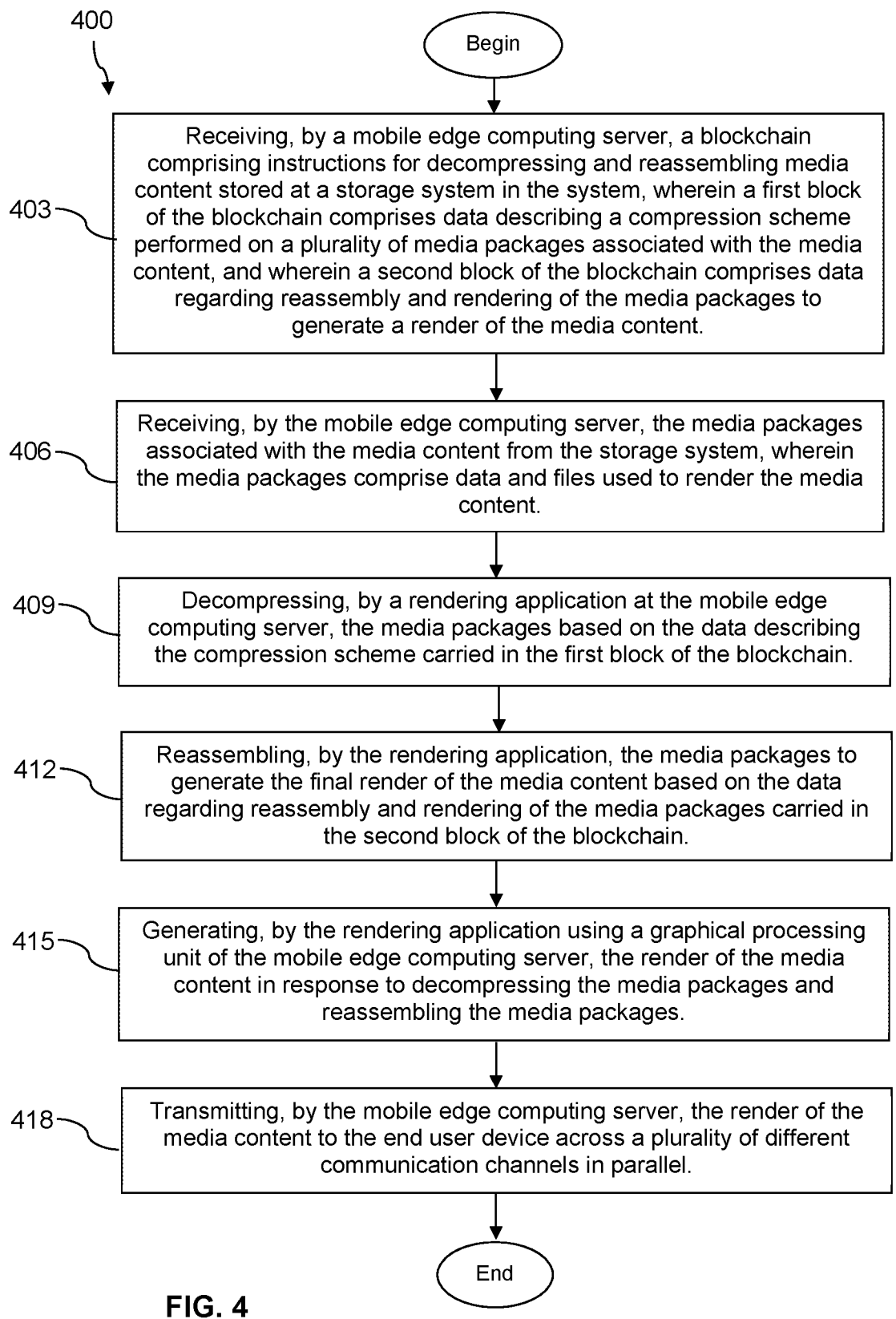
FIG. 4 is a flowchart of a first method according to an embodiment of the disclosure.

Turning now to FIG. 4, a method 400 is described. In an embodiment, method 400 may be performed by the MEC server 103. In an embodiment, method 400 may be performed once the MEC server 103 receives the ledger 161, encoded as a blockchain.

At block 403, method 400 comprises receiving, by a MEC server 103, a blockchain comprising instructions for decompressing and reassembling media content 123 stored at a storage system 111 in the system 100. In an embodiment, a first block 303A-N of the blockchain comprises data describing a compression scheme performed on media packages 150A-N associated with the media content 123. In an embodiment, a second block 303A-N of the blockchain comprises data regarding reassembly and rendering of the media packages 150A-N to generate a render of the media content 123.

At block 406, method 400 comprises receiving, by the MEC server 103, the media packages 150A-N associated with the media content 123 from the storage system 111. In an embodiment, the media packages comprise data and files used to render the media content 123. At block 409, method 400 comprises decompressing, by a rendering application 129 at the MEC server 103, the media packages 150A-N based on the data describing the compression scheme carried in the first block 303A-N of the blockchain. At block 412, method 400 comprises reassembling, by the rendering application 129, the media packages 150A-N to generate the render of the media content 123 based on the data regarding reassembly and rendering of the media packages 150A-N carried in the second block 303A-N of the blockchain.

At block 415, method 400 comprises generating, by the rendering application 129, using a GPU 132 of the MEC server 103, the render of the media content 123 in response to decompressing the media packages 150A-N and reassembling the media packages 150A-N. At block 418, method 400 comprises transmitting, by the MEC server 103, the render of the media content 123 to the end user device 102 across a plurality of different communication channels 219 in parallel.

In an embodiment, a third block 303A-N of the blockchain comprises location data of the media packages 150A-N at a plurality of databases nodes 153A-N in the storage system 111, in which receiving, by the rendering application 129, the media packages 150A-N comprises fetching, by the rendering application 129, the media packages 123A-N from the storage system 111 based on the location data of the media packages 150A-N at the database nodes 153A-N. In an embodiment, a fourth block of the blockchain comprises a device capability 146 of the end user device 102, in which reassembling the media packages 150A-N to render the media content 123 comprises rendering the media content 123 based on the device capability 146 of the end user device 102.

In an embodiment, method 400 further comprises receiving, by the rendering application 129, an updated blockchain from the end user device 102, in which the updated blockchain comprises a new block 303A-N indicating consumption data of the media content 123 at the end user device 102, updating, by the rendering application 129, local artificial intelligence systems based on the consumption data, and transmitting, by a transceiver 135 of the MEC server 103, the updated blockchain to a server 113 in communication with the storage system 111 to update artificial intelligence systems at the server 113. In an embodiment, method 400 further comprises receiving, by the transceiver 135, media packages 150A-N associated with frequently accessed media content 123 from the storage system 111 and one or more blockchains associated with the frequently accessed media content 123, storing, in a memory of the MEC server 103, the media packages 150A-N associated with frequently accessed media content 123 and the blockchains associated with the frequently accessed media content 123, rendering, by the rendering application, the frequently accessed media content 123 based on the one or more blockchains and a requesting end user device 102, and transmitting, by the transceiver 135, the rendered frequently accessed media content 123 to the requesting end user device 102.

In an embodiment, wherein the blockchain is received before receiving the media packages 150A-N and before receiving a request for the media content 123 from the end user device 102. In an embodiment, the blockchain and the media content 123 are received in a data stream 300 together.

Figure 5:
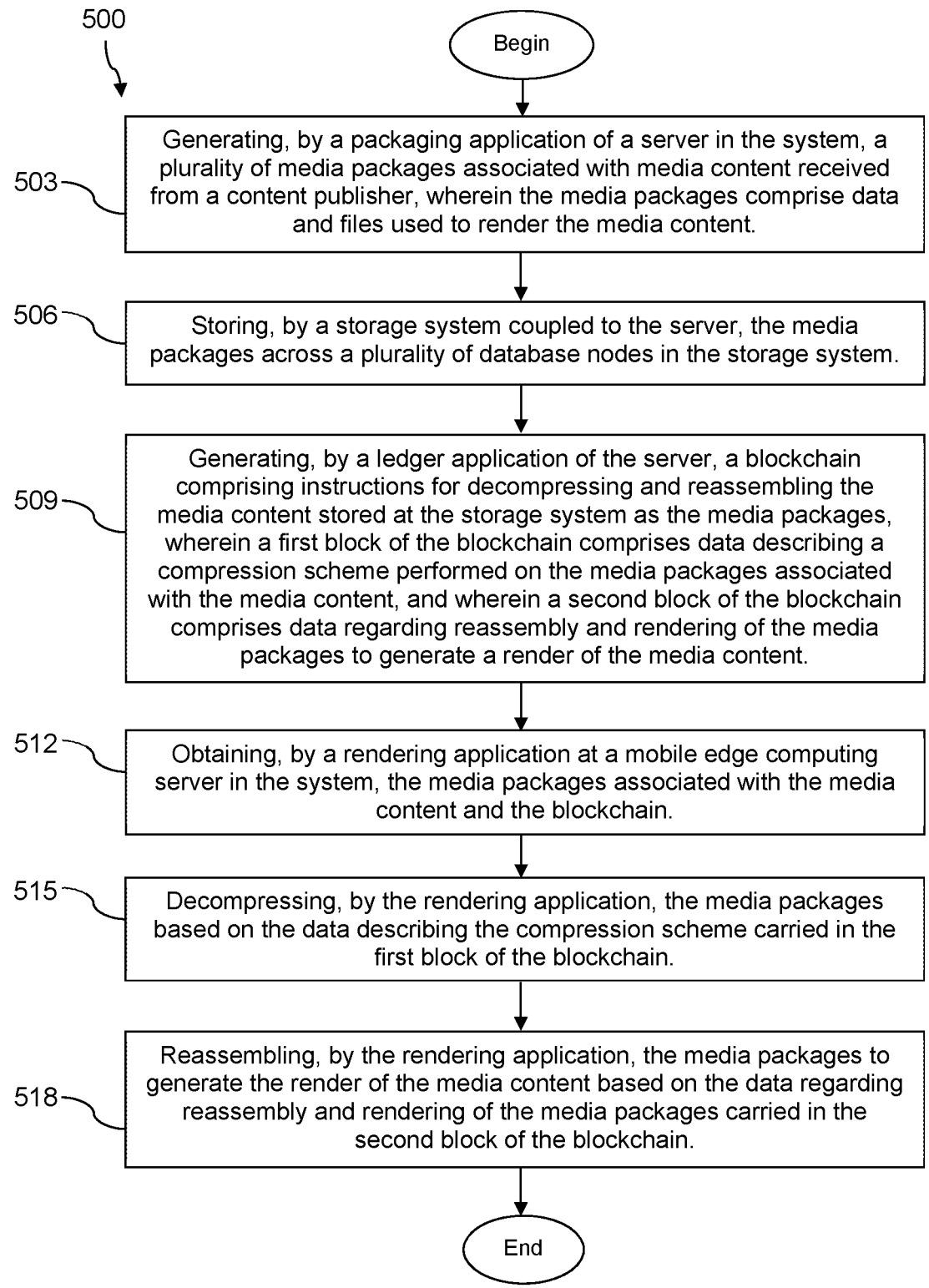
FIG. 5 is a flowchart of a second method according to an embodiment of the disclosure.

Turning now to FIG. 5, a method 500 is described. In an embodiment, method 500 may be performed by different components in the communications system 100 (e.g., the server 113 and MEC server 103). In an embodiment, method 500 may be performed after the server 113 has received media content 123 from a content publisher. In method 500, the ledger 161 is encoded as a blockchain.

At block 503, method 500 comprises generating, by a packaging application 156 of a server 113 in the communication system 100, a plurality of media packages 150A-N associated with media content 123 received from a content publisher. In an embodiment, the media packages 150A-N comprise data and files used to render the media content 123. At block 506, method 500 comprises storing, by a storage system 111 coupled to the server 113, the media packages 150A-N across a plurality of database nodes 153A-N in the storage system 111.

At block 509, method 500 comprises generating, by a ledger application 159 of the server, a blockchain comprising instructions for decompressing and reassembling the media content 123 stored at the storage system 111 as the media packages 150A-N. In an embodiment, a first block 303A-N of the blockchain comprises data describing a compression scheme performed on the media packages 150A-N associated with the media content 123. In an embodiment, a second block 303A-N of the blockchain comprises data regarding reassembly and rendering of the media packages 150A-N to generate a render of the media content 123.

At block 512, method 500 comprises obtaining, by a rendering application 129 at a MEC server 103 in the system, the media packages 150A-N associated with the media content 123 and the blockchain. At block 515, method 500 comprises decompressing, by the rendering application 129, the media packages 150A-N based on the data describing the compression scheme carried in the first block 303A-N of the blockchain. At block 518, method 500 comprises reassembling, by the rendering application 129, the media packages 150A-N to generate the render of the media content 123 based on the data regarding reassembly and rendering of the media packages 150A-N carried in the second block 303A-N of the blockchain. While not shown in FIG. 5, method 500 may further comprise transmitting, by the MEC server 103, a render of the media content 123 to the end user device 102 in response to decompressing the media packages 150A-B and reassembling the media packages 150A-B.

In an embodiment, a third block 303A-N of the blockchain comprises location data of the media packages 150A-N at the databases nodes 153A-N in the storage system 111. Method 500 may further comprise fetching, by the rendering application 129, the media packages 150A-N from the storage system 111 based on the location data of the media packages 150A-N at the database nodes 153A-N.

In an embodiment, a fourth block 303A-N of the blockchain comprises a device capability 146 of the end user device 102. Method 500 may further comprise rendering, by the rendering application 129, the media content 123 based on the device capability 146 of the end user device 102.

In an embodiment, method 500 further comprises receiving, by the rendering application, an updated blockchain from the end user device 102, in which the updated blockchain may comprise a new block indicating consumption data of the media content 123 at the end user device 102, updating, by the rendering application 129, local artificial intelligence systems based on the consumption data, and transmitting, by a transceiver 135 of the MEC server 103, the updated blockchain to a server 113 in communication with the storage system 111 to update artificial intelligence systems at the server 113.

In an embodiment, method 500 further comprises determining, by the ledger application 159, frequently accessed media content 123 based on one or more blockchains stored at the storage system 111 and including data indicating a consumption history of the frequently accessed media content 123 by one or more end user devices 102, in which the consumption history indicates that a quantity in which the frequently accessed media content 123 has been consumed by the one or more end user devices 102 exceeds a threshold, transmitting, by the ledger application 159, media packages 150A-N associated with frequently accessed media content 123 from the storage system 111 and the one or more blockchains to the MEC server 103, and storing, in a memory of the MEC server 103, the media packages 150A-N associated with frequently accessed media content 123 and the one or more blockchains.

In an embodiment, method 500 comprises receiving, by the rendering application 129, the media packages 150A-N and the blockchain across a plurality of different communication channels 216 in parallel. In an embodiment, method 500 comprises receiving, by the rendering application 129, the blockchain and the media packages 150A-N together in a single data stream 300.

Figure 6A:
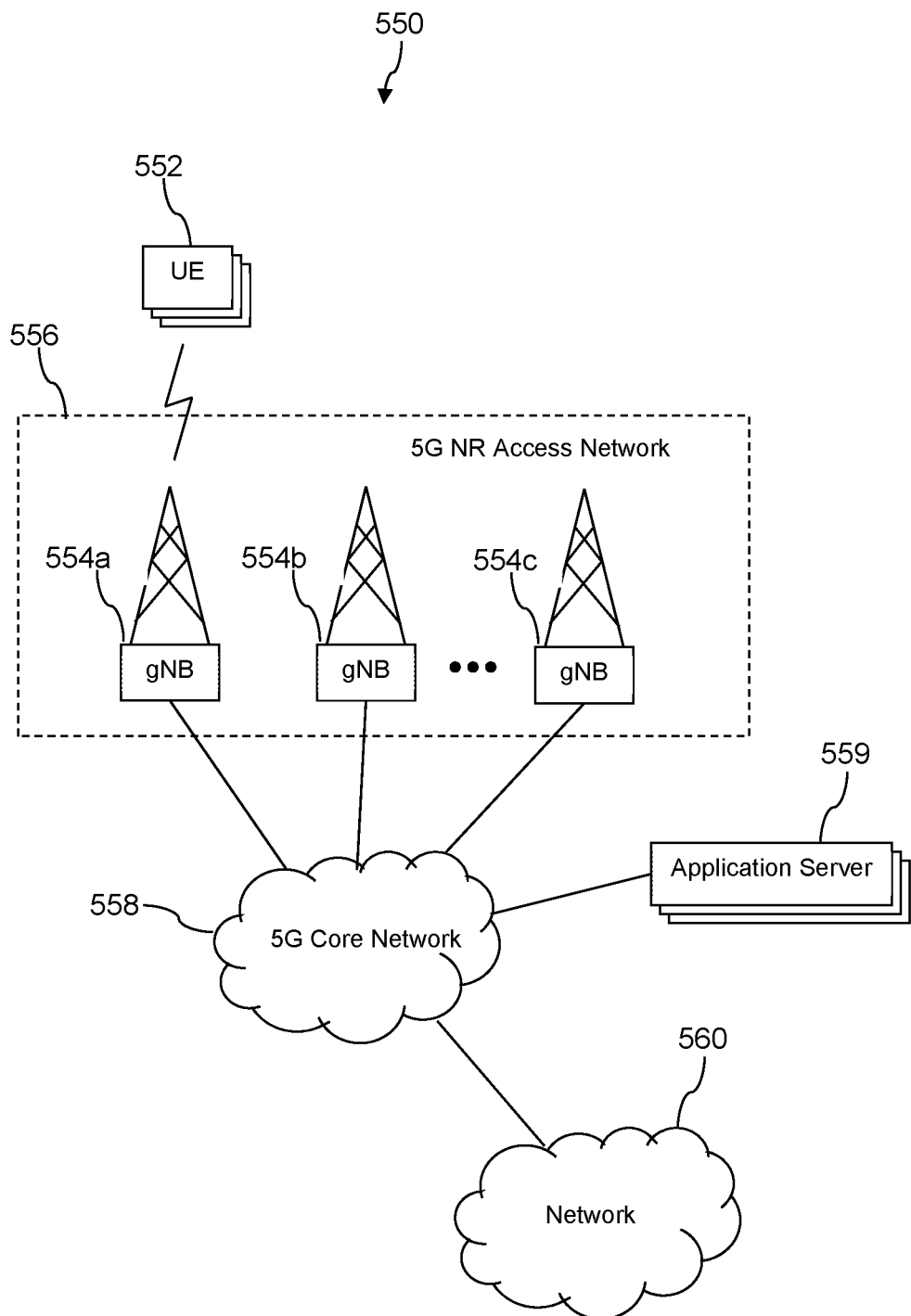
FIGS. 6A-B are block diagrams illustrating a communication system similar to the communication system of FIG. 1 according to an embodiment of the disclosure.

Turning now to FIG. 6A, an exemplary communication system 550 is described. In an embodiment, the communication system 550 may be implemented in the system 100 of FIG. 1. The communication system 550 includes a number of access nodes 554 that are configured to provide coverage in which UEs 552, such as cell phones, tablet computers, machine-type-communication devices, tracking devices, embedded wireless modules, and/or other wirelessly equipped communication devices (whether or not user operated), or devices such as end user device 102 and the MEC server 103, can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
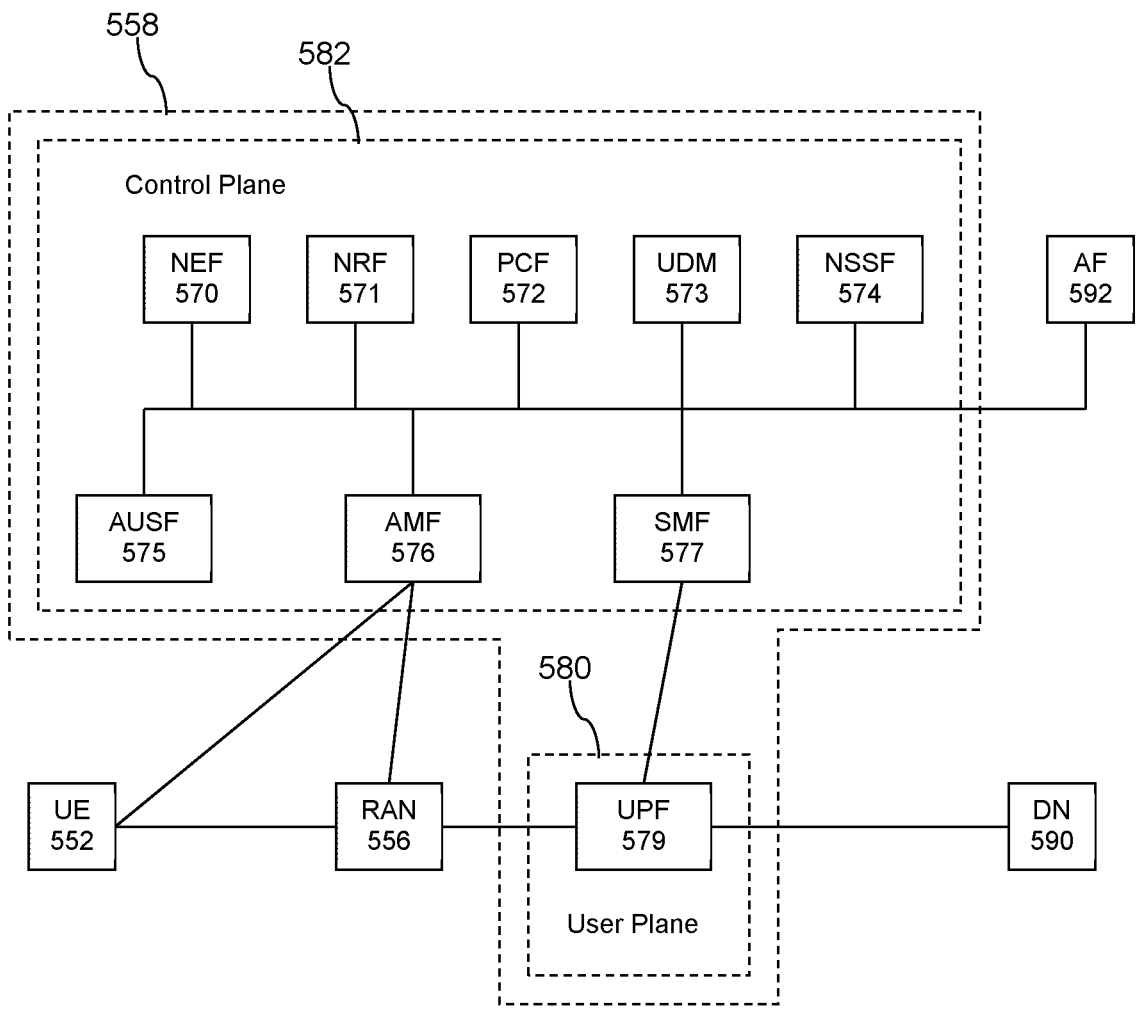

Turning now to FIG. 6B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 7:
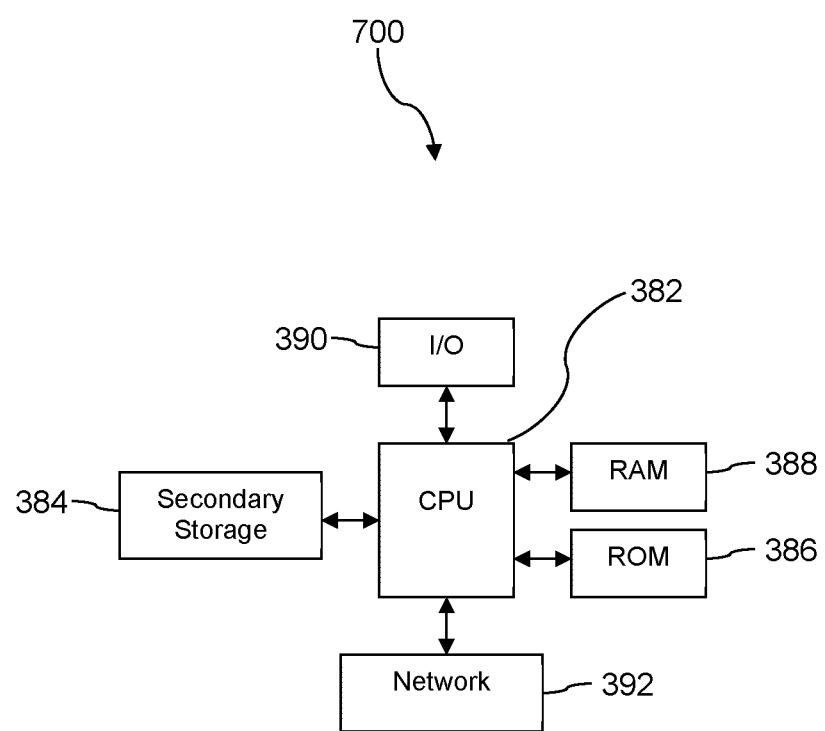
FIG. 7 is a block diagram of a computer system implemented within the communication system of FIG. 1 according to an embodiment of the disclosure.

FIG. 7 illustrates a computer system 700 suitable for implementing one or more embodiments disclosed herein. In an embodiment, the end user device 102, the MEC server 103, and the server 113 may be implemented as the computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 700. The processor 382 may process the executable instructions and/or data structures in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method performed by a system to deliver media content to an end user device, wherein the method comprises:
   receiving, by a mobile edge computing server, a blockchain comprising instructions for decompressing and reassembling media content stored at a storage system in the system;
   receiving, by the mobile edge computing server, media packages associated with the media content from the storage system;
   decompressing and reassembling, by a rendering application at the mobile edge computing server, the media packages to generate the render of the media content based on the instructions for decompressing and reassembling in the blockchain;
   generating, by the rendering application, the render of the media content in response to decompressing the media packages and reassembling the media packages; and
   transmitting, by the mobile edge computing server, the render of the media content to the end user device;
   receiving, by the rendering application, an updated blockchain from the end user device, wherein the updated blockchain comprises a new block indicating consumption data of the media content at the end user device;
   transmitting, by a transceiver of the mobile edge computing server, the updated blockchain to a server in communication with the storage system to update one or more artificial intelligence systems at the server; and
   receiving, by the mobile edge computing server from the storage system, one or more media packages based at least in part on the updated blockchain.

2. The method of claim 1, wherein a block of the blockchain comprises location data of the media packages at a plurality of databases in the storage system, and wherein receiving, by the rendering application, the media packages comprises fetching, by the rendering application, the media packages from the storage system based on the location data of the media packages at the databases.

3. The method of claim 1, wherein a block of the blockchain comprises a device capability of the end user device, and wherein reassembling, by the rendering application, the media packages to render the media content comprises rendering the media content based on the device capability of the end user device.

4. The method of claim 1, further comprising updating, by the rendering application, local artificial intelligence systems based on the consumption data.

5. The method of claim 1, further comprising:
   receiving, by a transceiver of the mobile edge computing server, media packages associated with frequently accessed media content from the storage system and one or more blockchains associated with the frequently accessed media content;
   storing, in a memory of the mobile edge computing server, the media packages associated with frequently accessed media content and the one or more blockchains associated with the frequently accessed media content;
   rendering, by the rendering application, the frequently accessed media content based on the one or more blockchains and a requesting end user device; and
   transmitting, by the transceiver, the rendered frequently accessed media content to the requesting end user device.

6. The method of claim 1, wherein the blockchain is received before receiving the media packages and before receiving a request for the media content from the end user device.

7. The method of claim 1, wherein the blockchain and the media content are received in a data stream together.

8. A method performed by a system to deliver media content to an end user device, wherein the method comprises:
   storing, by a storage system coupled to a server, media packages associated with media content across a plurality of databases in the storage system;
   generating, by a ledger application of the server, a blockchain comprising instructions for decompressing and reassembling the media content stored at the storage system as the media packages, wherein the blockchain comprises a block that includes location data of the media packages at the databases in the storage system;
   obtaining, by a rendering application at a mobile edge computing server in the system, the media packages associated with the media content and the blockchain by fetching the media packages from the storage system based on the location data of the media packages at the databases;
   decompressing and reassembling, by the rendering application, the media packages to generate a render of the media content based on the instructions for decompressing and reassembling in the blockchain; and
   transmitting, by the mobile edge computing server, the render of the media content to the end user device in response to decompressing the media packages and reassembling the media packages.

9. The method of claim 8, wherein a fourth block of the blockchain comprises a device capability of the end user device, and wherein reassembling, by the rendering application, the media packages to render the media content comprises rendering, by the rendering application, the media content based on the device capability of the end user device.

10. The method of claim 8, further comprising:
    receiving, by the rendering application, an updated blockchain from the end user device, wherein the updated blockchain comprises a new block indicating consumption data of the media content at the end user device;
    updating, by the rendering application, local artificial intelligence systems based on the consumption data; and
    transmitting, by a transceiver of the mobile edge computing server, the updated blockchain to the server in communication with the storage system to update artificial intelligence systems at the server.

11. The method of claim 10, further comprising determining, by the ledger application, frequently accessed media content based on the updated blockchain indicating the consumption data, wherein the consumption data indicates that a quantity in which the frequently accessed media content has been consumed by the end user device exceeds a threshold.

12. The method of claim 11, further comprising:
transmitting, by the ledger application, media packages associated with frequently accessed media content from the storage system and the updated blockchain to the mobile edge computing server; and
storing, in a memory of the mobile edge computing server, the media packages associated with frequently accessed media content and the updated blockchain.

13. The method of claim 8, wherein obtaining, by the rendering application, the media packages and the blockchain comprises receiving, by the rendering application, the media packages and the blockchain across a plurality of different communication channels in parallel.

14. The method of claim 8, wherein obtaining, by the rendering application, the media packages and the blockchain comprises receiving, by the rendering application, the blockchain and the media packages together in a single data stream.

15. A system comprising:
a server, comprising:
a first processor;
a first non-transitory memory; and
a ledger application stored in the first non-transitory memory, which when executed by the first processor, causes the first processor to be configured to generate a blockchain comprising instructions for decompressing and reassembling media content stored at a storage system as media packages; and
a mobile edge computing server coupled to the server and comprising:
a second processor;
a second non-transitory memory;
a rendering application stored in the second non-transitory memory, which when executed by the second processor, causes the second processor to be configured to:
obtain the media packages associated with the media content and the blockchain,
decompress and reassemble the media packages to generate the render of the media content based on the instructions for decompressing and reassembling in the blockchain,
transmit a render of the media content to an end user device in response to decompressing the media packages and reassembling the media packages, and
receive an updated blockchain from the end user device, wherein the updated blockchain comprises a new block indicating consumption data of the media content at the end user device,
wherein the mobile edge computing server transmits the updated blockchain to the server to update one or more artificial intelligence systems at the server, and wherein the mobile edge computing server receives, from the storage system, one or more media packages based at least in part on the updated blockchain.

16. The system of claim 15, wherein a block of the blockchain comprises location data of the media packages at a plurality of databases in the storage system.

17. The system of claim 15, wherein a block of the blockchain comprises a device capability of the end user device.

18. The system of claim 15, wherein the rendering application further causes the second processor to be configured to update local artificial intelligence systems based on the consumption data.

19. The system of claim 15, wherein the rendering application further causes the second processor to be configured to receive the media packages and the blockchain across a plurality of different communication channels in parallel.

20. The system of claim 15, wherein the rendering application further causes the second processor to be configured to receive the block chain and the media content together in a single data stream.

* * * * *